US011966181B2

(12) United States Patent
Nemoto et al.

(10) Patent No.: US 11,966,181 B2
(45) Date of Patent: Apr. 23, 2024

(54) FIXING DEVICE

(71) Applicant: NOK CORPORATION, Tokyo (JP)

(72) Inventors: Wataru Nemoto, Fujisawa (JP); Kenji Sasaki, Fujisawa (JP); Masaya Suzuki, Fujisawa (JP); Hidetomo Mukai, Fujisawa (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 17/926,860

(22) PCT Filed: Mar. 19, 2021

(86) PCT No.: PCT/JP2021/011454

§ 371 (c)(1),
(2) Date: Nov. 21, 2022

(87) PCT Pub. No.: WO2021/256037

PCT Pub. Date: Dec. 23, 2021

(65) Prior Publication Data

US 2023/0205122 A1 Jun. 29, 2023

(30) Foreign Application Priority Data

Jun. 18, 2020 (JP) ................................ 2020-105319

(51) Int. Cl.
*G03G 15/20* (2006.01)

(52) U.S. Cl.
CPC ................................ *G03G 15/2057* (2013.01)

(58) Field of Classification Search
CPC ........... G03G 15/2053; G03G 15/2057; G03G 15/206
See application file for complete search history.

(56) References Cited

U.S. PATENT DOCUMENTS 5,471,288 A 11/1995 Ohtsuka et al.
5,918,099 A 6/1999 Schlueter, Jr. et al.
(Continued)

FOREIGN PATENT DOCUMENTS

JP H06-258969 A 9/1994
JP 2000-227110 A 8/2000
(Continued)

OTHER PUBLICATIONS

International Search Report (English and Japanese) issued in PCT/JP2021/011454, dated May 11, 2021; ISA/JP (5 pages).

(Continued)

*Primary Examiner* — Hoang X Ngo
(74) *Attorney, Agent, or Firm* — Harness, Dickey & Pierce, P.L.C.

(57) ABSTRACT

A tubular fuser device rotates and is in contact with a sheet on which a positively charged toner image is formed to fix the toner image to the sheet. The fuser device includes a tubular substrate made of a metal, a rubber layer covering the outer periphery of the substrate, an adhesion layer covering the outer periphery of the rubber layer, and a surface layer made of a resin covering the outer periphery of the adhesion layer. The adhesion layer has a first adhesion layer that is in contact with the rubber layer and a second adhesion layer interposed between the first adhesion layer and the surface layer. The first adhesion layer is made of a fluororesin-based adhesive, and the second adhesion layer is made of a silicone rubber-based adhesive containing an ionic conductor.

2 Claims, 8 Drawing Sheets

(56) References Cited

U.S. PATENT DOCUMENTS

| | | | |
|---|---|---|---|
| 6,284,373 B1 | 9/2001 | Ream et al. | |
| 10,222,729 B2 | 3/2019 | Takagi | |
| 2001/0044025 A1 | 11/2001 | Ream et al. | |
| 2003/0190470 A1 | 10/2003 | Ream et al. | |
| 2012/0195658 A1 | 8/2012 | Sakakibara et al. | |
| 2012/0315418 A1 | 12/2012 | Nakajima et al. | |
| 2017/0090370 A1* | 3/2017 | Shinagawa .......... | G03G 15/206 |

FOREIGN PATENT DOCUMENTS

| | | | |
|---|---|---|---|
| JP | 2003-508811 | A | 3/2003 |
| JP | 2012-159621 | A | 8/2012 |
| JP | 2018-136412 | A | 8/2018 |
| WO | 2001-018290 | A1 | 3/2001 |
| WO | 2012-029380 | A1 | 3/2012 |

OTHER PUBLICATIONS

First Office Action issued in corresponding Chinese Patent Application No. 202180040545.3 dated Mar. 23, 2023, with English translation (8 Pages).

* cited by examiner

FIG. 12

| | | | SAMPLE 1 | SAMPLE 2 | SAMPLE 3 | SAMPLE 4 |
|---|---|---|---|---|---|---|
| FUSER BELT ELEMENTS | SLIDE LAYER 12 | MATERIAL | PTFE | PTFE | PTFE | PTFE |
| | | THICKNESS | 12 μm | 12 μm | 12 μm | 12 μm |
| | SUBSTRATE 11 | MATERIAL | NICKEL | NICKEL | NICKEL | NICKEL |
| | | THICKNESS | 40 μm | 40 μm | 40 μm | 40 μm |
| | PRIMER LAYER 13 | MATERIAL | SILICONE RUBBER-BASED | SILICONE RUBBER-BASED | SILICONE RUBBER-BASED | SILICONE RUBBER-BASED |
| | | THICKNESS | 2 μm | 2 μm | 2 μm | 2 μm |
| | RUBBER LAYER 14 | MATERIAL | NON-CONDUCTIVE SILICONE RUBBER | NON-CONDUCTIVE SILICONE RUBBER | NON-CONDUCTIVE SILICONE RUBBER | NON-CONDUCTIVE SILICONE RUBBER |
| | | THICKNESS | 285 μm | 285 μm | 285 μm | 285 μm |
| | FIRST ADHESION LAYER 15a | MATERIAL | NON-CONDUCTIVE FLUORORESIN-BASED | NON-CONDUCTIVE FLUORORESIN-BASED | NON-CONDUCTIVE FLUORORESIN-BASED | NONE |
| | | THICKNESS | 2 μm | 2 μm | 2 μm | 2 μm |
| | SECOND ADHESION LAYER 15b | MATERIAL | NON-CONDUCTIVE SILICONE RUBBER-BASED + IONIC CONDUCTOR (0.5 phr) | NON-CONDUCTIVE SILICONE RUBBER-BASED + IONIC CONDUCTOR (1.5 phr) | NON-CONDUCTIVE SILICONE RUBBER-BASED | NON-CONDUCTIVE SILICONE RUBBER-BASED |
| | | THICKNESS | 15 μm | 15 μm | 15 μm | 15 μm |
| | SURFACE LAYER 16 | MATERIAL | INSULATIVE PFA | INSULATIVE PFA | INSULATIVE PFA | INSULATIVE PFA |
| | | THICKNESS | 30 μm | 30 μm | 30 μm | 30 μm |
| ELECTRICAL FEATURES | ELECTROSTATIC CAPACITY C (pF) | | 36.7 | 13.7 | 37.7 | 36.6 |
| | ELECTRICAL RESISTANCE R (Ω) | | 3.24E+08 | 6.75E+08 | 1.47E+08 | 1.00E+09 |
| | DIELECTRIC RELAXATION TIME τ (msec) | | 10 | 9 | 6 | 36 |
| | ELECTROSTATIC CAPACITY PER UNIT AREA C／A (pF/cm$^2$) | | 8.11 | 3.03 | 8.33 | 8.09 |
| | CHARGE DECAY ΔV (V) | | 30 | 1 | 220 | 10 |
| | CHARGE DECAY (ΔV)／THICKNESS (t) (V/μm) | | 7.77E-02 | 2.59E-03 | 5.70E-01 | 2.60E-02 |
| | RATIO Ct／AΔV (F/Vμm) | | 1.04E-18 | 1.17E-17 | 1.46E-19 | 3.11E-18 |
| FOG | 1st SHEET | | DID NOT OCCUR | DID NOT OCCUR | OCCURRED | OCCURRED |
| FOG | 50th SHEET | | DID NOT OCCUR | DID NOT OCCUR | DID NOT OCCUR | OCCURRED |
| FOG | 100th SHEET | | DID NOT OCCUR | DID NOT OCCUR | DID NOT OCCUR | OCCURRED |

FIG. 13

| LAYER | RUBBER LAYER 14 | FIRST ADHESION LAYER 15a | SECOND ADHESION LAYER 15b | SECOND ADHESION LAYER 15b | SURFACE LAYER 16 |
|---|---|---|---|---|---|
| MATERIAL | NON-CONDUCTIVE SILICONE RUBBER | NON-CONDUCTIVE FLUORORESIN-BASED | NON-CONDUCTIVE SILICONE RUBBER-BASED + IONIC CONDUCTOR | NON-CONDUCTIVE SILICONE RUBBER-BASED | PFA |
| | X-34-2008-2 | PJ-CL990 | KE-1880 | KE-1880 | |
| THICKNESS (μm) | 2000 | 2000 | 2000 | 2000 | 30 |
| ELECTRICAL RESISTANCE R (Ω) | 8.40E+08 | 3.16E+03 | 1.20E+09 | 1.10E+09 | 1.00E+15 |
| IMAGINARY PART ε OF COMPLEX PERMITTIVITY | 3.17 | 9.50 | 2.50 | 2.85 | 2.20 |

FIXING DEVICE

CROSS REFERENCE TO RELATED APPLICATIONS

This application is a U.S. National Phase Application under 35 U.S.C. 371 of International Application No. PCT/JP2021/011454, filed on Mar. 19, 2021, which claims priority to Japanese Patent Application No. 2020-105319, filed on Jun. 18, 2020. The entire disclosures of the above applications are expressly incorporated by reference herein.

BACKGROUND

Technical Field

The present invention relates to fuser devices used in fuser apparatuses of an electrographic image forming apparatus.

Related Art

A fuser apparatus of an electrographic forming apparatus (for example, a copying machine or a printer) pressurizes a charged toner on a moving sheet and fixes the toner to the sheet. Accordingly, the fuser apparatus is equipped with a pair of rolls (a fuser roll and a pressure roll) or with a fuser belt and pressure roll. In a fuser of the type with a fuser belt and a pressure roll, toner is permanently bonded to a sheet as the sheet passes through the nip between the fuser belt and the pressure roll (JP-A-2018-136412). In this type, the fuser belt is pressed toward the pressure roll by a fuser roll or fixing pad to fuse the toner by heating. The fuser belt is reheated to a high temperature by a heating device.

In use of a fuser apparatus, it is desirable for toner images to be fixed to sheets without excess or deficiency of toner when the sheets pass through the nip. However, due to generation of static electricity, an excessive amount of toner may be attracted to a sheet, or conversely, toner may be repelled from the sheet. Such a phenomenon, referred to as electrostatic offset, causes a disturbance in an image to be formed.

Measures to reduce electrostatic offset have been attempted, for example, as disclosed in JP-A-2018-136412.

In a fuser device deployed after a developing unit for attaching a positively charged toner to a sheet for fixing the toner to the sheet, it is desired to further effectively reduce electrostatic offset.

Accordingly, the present invention provides a fuser device for fixing a positively charged toner image to a sheet, which can effectively reduce electrostatic offset.

SUMMARY

According to an aspect of the present invention, there is provided a tubular fuser device that rotates and is in contact with a sheet on which a positively charged toner image is formed to fix the toner image to the sheet. The fuser device includes a tubular substrate made of a metal, a rubber layer covering the outer periphery of the substrate, an adhesion layer covering the outer periphery of the rubber layer, and a surface layer made of a resin covering the outer periphery of the adhesion layer. The adhesion layer has a first adhesion layer that is in contact with the rubber layer and a second adhesion layer interposed between the first adhesion layer and the surface layer. The first adhesion layer is made of a fluororesin-based adhesive, and the second adhesion layer is made of a silicone rubber-based adhesive containing an ionic conductor.

In this aspect, it is possible to effectively reduce the electrostatic offset.

BRIEF DESCRIPTION OF THE DRAWINGS

FIG. 12 is a table showing details of multiple samples of the fuser device;

FIG. 13 is a table showing electrical features of materials of layers forming the fuser device;

DETAILED DESCRIPTION

Hereinafter, an embodiment according to the present invention will be described with reference to the accompanying drawings. It is of note that the drawings are not necessarily to scale, and certain features may be depicted in exaggerated form or may be omitted.

An electrographic forming apparatus forms an image of toner (toner image) on a sheet of paper that is a transported recording medium. Although details of the image forming apparatus are not shown, the image forming apparatus includes a photoconductor drum, a charger, an exposure unit, a developer, a transfer unit, and a fuser apparatus. The charger, the exposure unit, the developer, the transfer unit, and the fuser apparatus are disposed around the photoconductor drum. In this embodiment, the toner is positively charged, so that the toner attaches to the sheet, which is conveyed to the fuser apparatus.

Figure 1:
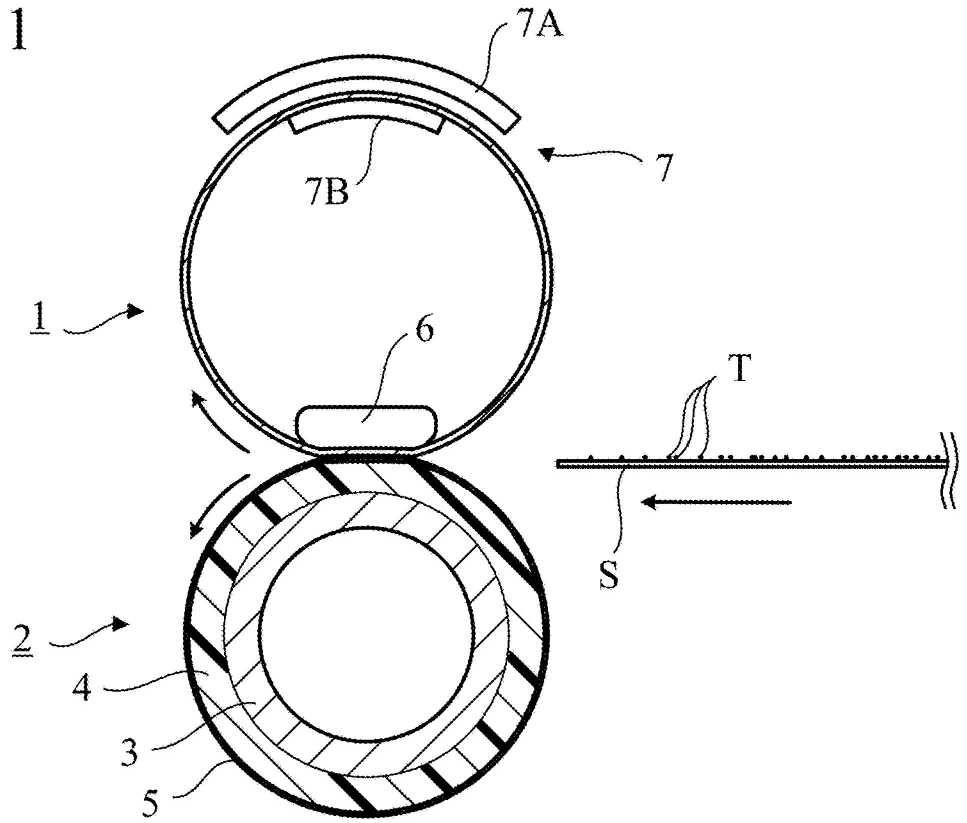
FIG. 1 is a schematic cross-sectional view showing an example of a fuser apparatus including a fuser device according to an embodiment of the present invention.

As shown in FIG. 1, the fuser apparatus has a movable fuser belt (fuser device) 1 and a rotatable pressure roll 2. While the sheet S passes through the nip between the fuser belt 1 and the pressure roll 2, toner particles T are fixed to the sheet S. The fuser belt 1 and the pressure roll 2 pressurize the toner particles T on the sheet S. The fuser belt 1 fuses the toner particles T by heating.

The pressure roll 2 includes a core member 3, an elastic layer 4 covering the outer periphery of the core member 3, and a release layer 5 covering the outer periphery of the elastic layer 4.

The core member 3 is a hard round rod. The material of the core member 3 is not limited, but may be, for example, a metal such as iron, aluminum, etc. or a resin material. The core member 3 may be hollow or solid.

The elastic layer 4 is a hollow cylinder mounted on the outer peripheral surface of the core member 3 over the entire circumference, and is formed of a porous elastic material such as sponge. However, the elastic layer 4 may be made of an elastic material that is not porous.

The release layer 5 is a thin layer mounted on the outer peripheral surface of the elastic layer 4 over the entire circumference, and facilitates separation of the pressure roll 2 from the toner particles T fixed to the sheet S. Although FIG. 1 shows that a toner image is formed on one surface of the sheet S, it is of note that after the toner particles T are fixed to one surface of the sheet S, the toner particles T may be fixed to the other surface of the sheet S. In this case, the toner particles T are brought into contact with the pressure roll 2 in the nip.

The release layer 5 is formed of a synthetic resin material that can be easily separated from the toner particles T. The material of the release layer 5 is preferably a fluororesin. Such a fluororesin is, for example, a perfluoroalkoxyfluororesin (PFA), polytetrafluoroethylene (PTFE), a tetrafluoroethylene-hexafluoropropylene copolymer (FEP), or a tetrafluoroethylene-ethylene copolymer (ETFE).

The fuser belt 1 is a hollow cylinder, and can also be considered, in another point of view, as a roll with a cylindrical wall having a small thickness. A fixing pad 6 made of a resin is disposed inside the fuser belt 1. The fixing pad 6 presses the fuser belt 1 against the pressure roll 2 to maintain an appropriate width of the nip between the fuser belt 1 and the pressure roll 2. In the nip, the fuser belt 1 and the pressure roll 2 are slightly deformed under mutual pressure.

In the vicinity of the fuser belt 1, a heater 7 is disposed. The heater 7 reheats the fuser belt 1 cooled as a result of being deprived of heat by the pressure roll 2 at the nip. In the example shown in FIG. 1, the heater 7 has a known electromagnetic induction heater 7A and a magnetic field absorber 7B, in which the electromagnetic induction heater 7A is disposed outside the fuser belt 1 and the magnetic field absorber 7B is disposed inside the fuser belt 1.

However, the type of the heater is not limited to the example shown in FIG. 1. For example, as shown in FIG. 2, a heat generating source such as a halogen heater 8 disposed inside the fuser belt 1 may be used as the heater.

Figure 2:
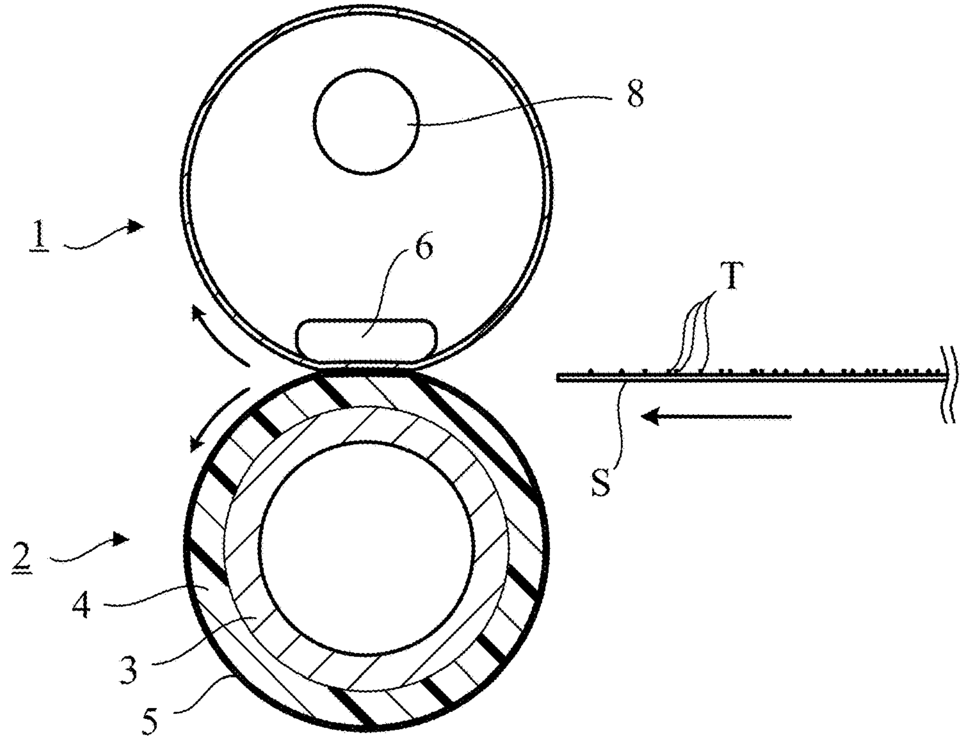
FIG. 2 is a schematic cross-sectional view showing another example of a fuser apparatus including a fuser device according to an embodiment.

In the examples of FIGS. 1 and 2, the fixing pad 6 is used, but a rotatable fuser roll may be disposed inside the fuser belt 1 instead of the fixing pad 6.

Figure 3:
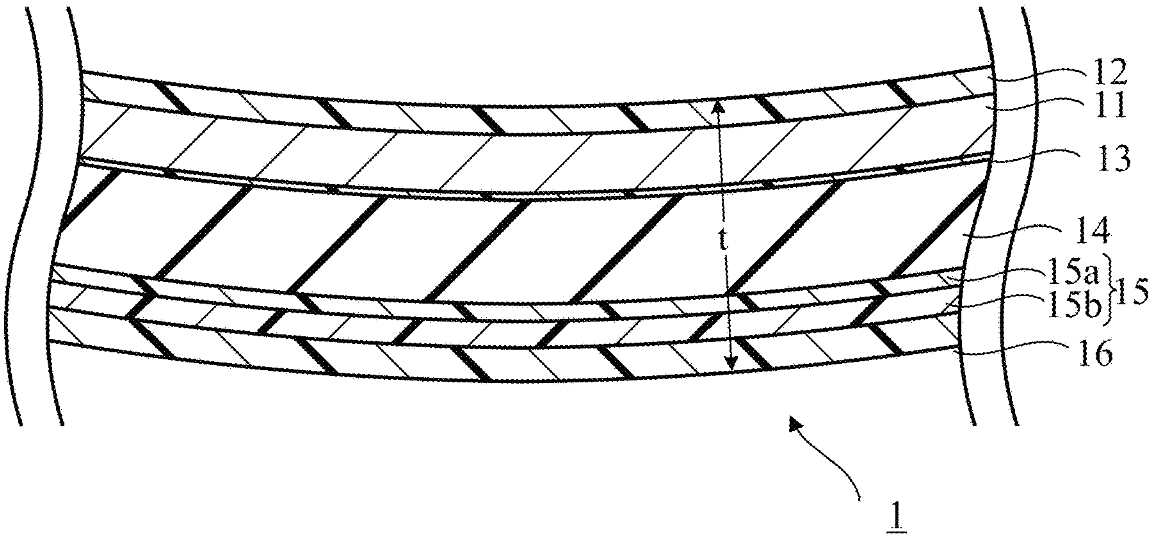
FIG. 3 is a cross-sectional view of a portion of a fuser device according to an embodiment.

As shown in FIG. 3, the fuser belt 1 has a substrate 11, a slide layer 12, a primer layer 13, a rubber layer 14, an adhesion layer 15, and a surface layer 16.

The substrate 11 is a hollow metal cylinder. The material of the substrate 11 may be, for example, nickel or stainless steel. The substrate 11 may be formed by sandwiching a copper layer between one nickel layer and another nickel layer. The substrate 11 ensures rigidity of the fuser belt 1 and enhances thermal conductivity of the fuser belt 1.

The slide layer 12 is a layer of uniform thickness that coats the inner periphery of the substrate 11. The slide layer 12 slidably contacts the fixing pad 6 and/or other components of the fuser apparatus. The slide layer 12 is made of a material having a low coefficient of friction, for example, a fluororesin. A preferred fluororesin is, for example, PTFE, PFA, FEP, or ETFE.

The primer layer 13 is a layer of uniform thickness that covers an outer periphery of the substrate 11. The primer layer 13 has a role in bonding the slide layer 12 and the rubber layer 14. The material of the primer layer 13 may vary depending on the material of the rubber layer 14.

The rubber layer 14 is a layer of uniform thickness that covers an outer periphery of the primer layer 13. The rubber layer 14 is the thickest layer of the fuser belt 1. The rubber layer 14 imparts appropriate elasticity to the fuser belt 1 for fixing the toner particles T. The rubber layer 14 is made of, for example, silicone rubber. In a case in which the rubber layer 14 is made of silicone rubber, it is preferable that the primer layer 13 be made of a silicone-based adhesive (silicone rubber-based adhesive or silicone resin-based adhesive).

The adhesion layer 15 is a layer of uniform thickness that covers the outer periphery of the rubber layer 14. The adhesion layer 15 has a role in bonding the rubber layer 14 and the surface layer 16. The adhesion layer 15 has an inner first adhesion layer 15*a* and an outer second adhesion layer 15*b*. The first adhesion layer 15*a* has a uniform thickness and is in contact with the rubber layer 14, and the second adhesion layer 15*b* has a uniform thickness and is in contact with the surface layer 16. The first adhesion layer 15*a* is made of a fluororesin-based adhesive. The second adhesion layer 15*b* is made of a silicone rubber-based adhesive containing an ionic conductor. The second adhesion layer 15*b* is thicker than the first adhesion layer 15*a*.

The surface layer 16 is a layer of uniform thickness that covers the outer periphery of the adhesion layer 15. The surface layer 16 facilitates separation of the fuser belt 1 from the toner particles T fixed to sheets P. The surface layer 16 is made of a synthetic resin material that can be easily separated from the toner particles T. The material of the surface layer 16 is preferably a fluororesin. A preferred fluororesin is, for example, PFA, PTFE, FEP, or ETFE.

However, other layers may be interposed between the above-mentioned layers.

Hereinafter, a method of manufacturing the fuser belt 1 will be described.

Figure 4:
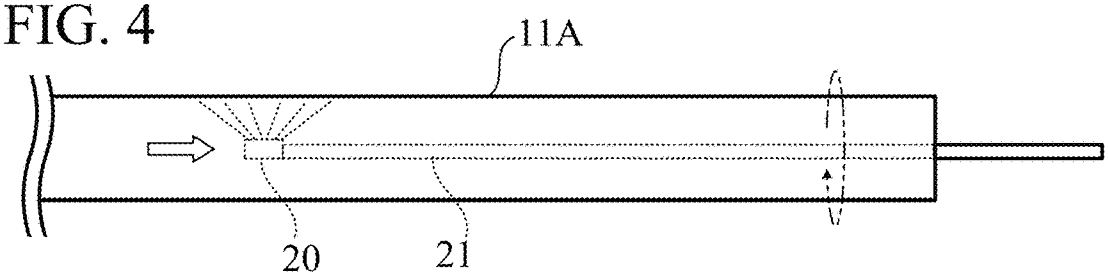
FIG. 4 is a schematic diagram showing a step of manufacturing the fuser device according to the embodiment.

First, as shown in FIG. 4, a metal tube 11A shaped as a hollow cylinder is prepared. The metal tube 11A corresponds to the substrate 11 in the fuser belt 1 (finished product), but has a length several times that of the fuser belt 1 of the finished product. The metal tube 11A can be manufactured, for example, by electroforming.

Next, as shown in FIG. 4, the metal tube 11A is rotated about the axis thereof and a spray nozzle 20 is inserted into the interior of the metal tube 11A, and while moving the spray nozzle 20, the material of the slide layer 12 is supplied to the spray nozzle 20 via a tube 21, and the spray nozzle 20 sprays the material of the slide layer 12. Thereafter, the material is cured by heating to form a slide layer 12.

Figure 5:
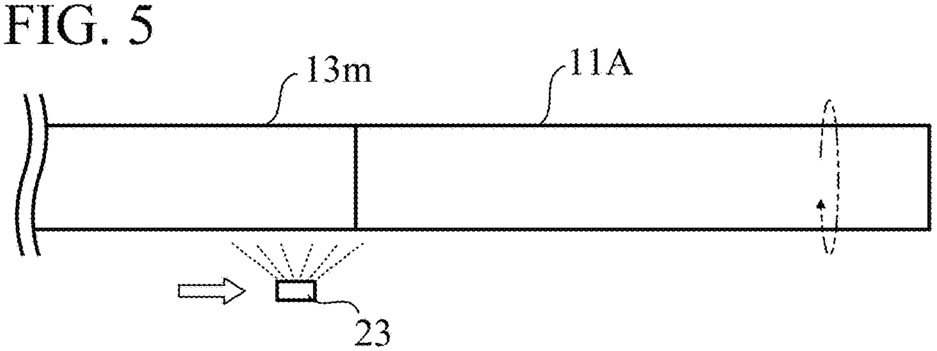
FIG. 5 is a schematic diagram showing a step after the step of FIG. 4.

Next, as shown in FIG. 5, while rotating the metal tube 11A about the axis thereof and moving another spray nozzle 23, the material 13*m* of the primer layer 13 is sprayed onto the outer peripheral surface of the metal tube 11A from the spray nozzle 23. Thereafter, the primer layer 13 is formed by heating to dry the material 13*m*.

Figure 6:
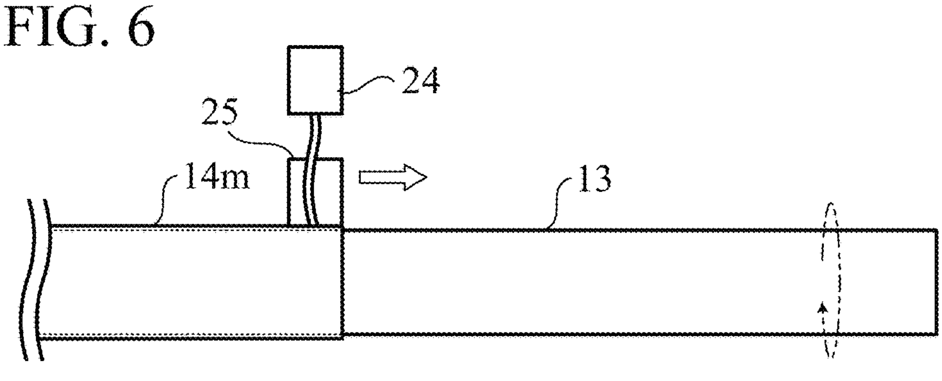
FIG. 6 is a schematic diagram showing a step after the step of FIG. 5.

Next, as shown in FIG. 6, the metal tube 11A is rotated about the axis thereof, and while the material 14*m* of the rubber layer 14 is supplied to the outer peripheral surface of the primer layer 13 by a rubber supply device 24, the material 14*m* of the rubber layer 14 is leveled evenly (to have a uniform thickness) by a blade 25 with a straight tip end. In this way, the surface of the primer layer 13 is coated with the material of the rubber layer 14. Thereafter, the rubber layer 14 is formed by heating to cure the material 14*m*.

Figure 7:
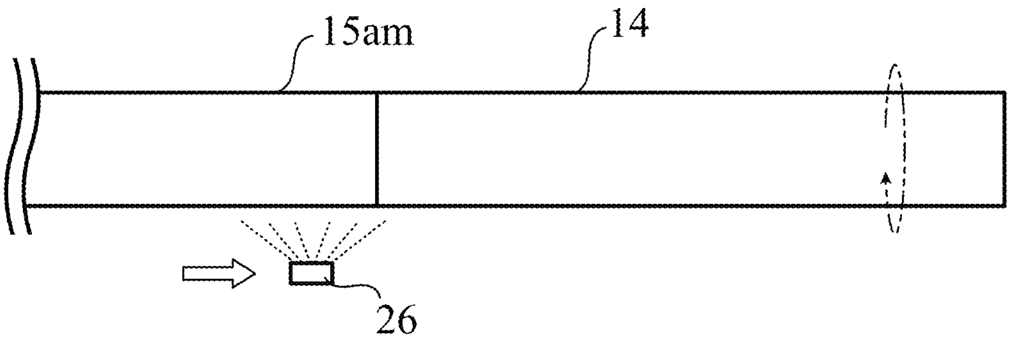
FIG. 7 is a schematic diagram showing a step after the step of FIG. 6.

Next, as shown in FIG. 7, while rotating the metal tube 11A about the axis thereof and moving another spray nozzle 26, the material 15*am* of the first adhesion layer 15*a* is sprayed onto the outer peripheral surface of the rubber layer 14 from the spray nozzle 26. Thereafter, the first adhesion layer 15*a* is formed by heating to dry the material 15*am*.

Figure 8:
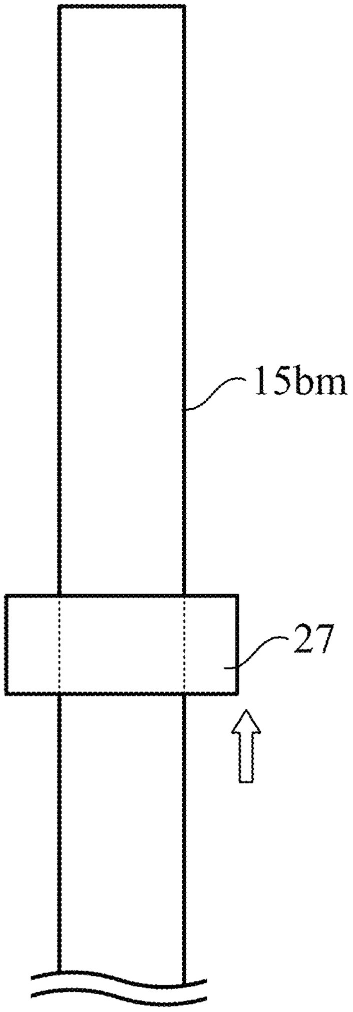
FIG. 8 is a schematic diagram showing a step after the step of FIG. 7.

Next, as shown in FIG. 8, the material 15*bm* of the second adhesion layer 15*b* is applied around the first adhesion layer 15*a*, and the metal tube 11A is inserted into a ring 27. By moving the ring 27 along the axial direction of the metal tube 11A, the material 15*bm* is leveled evenly (to have a uniform thickness) by the inner peripheral surface of the ring 27.

Figure 9:
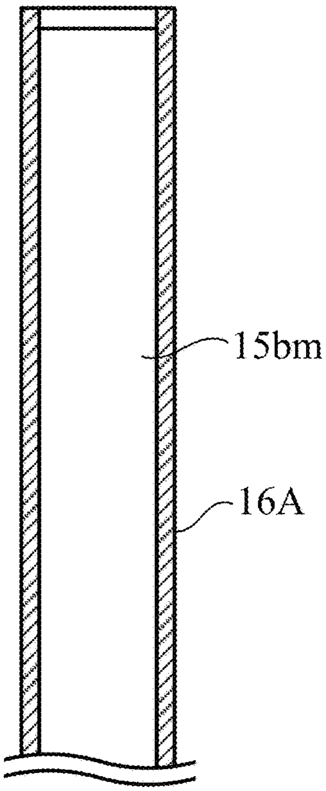
FIG. 9 is a schematic diagram showing a step after the step of FIG. 8.

Next, as shown in FIG. 9, a tube 16A is placed around the material 15*bm* of the second adhesion layer 15*b*. In other words, the metal tube 11A is inserted into the tube 16A. The tube 16A corresponds to the surface layer 16 in the fuser belt 1 (finished product), but has a length several times that of the fuser belt 1 of the finished product.

Figure 10:
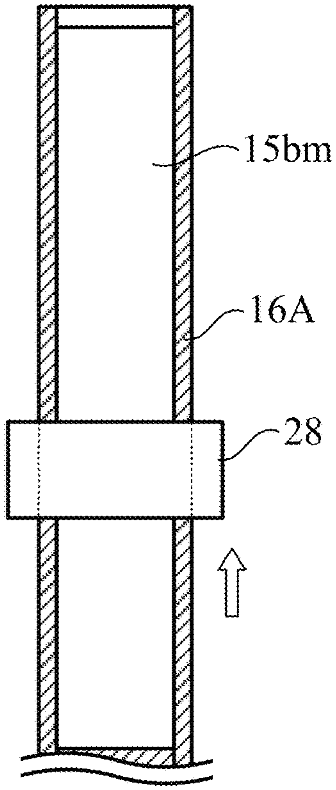
FIG. 10 is a schematic diagram showing a step after the step of FIG. 9.
Figure 11:
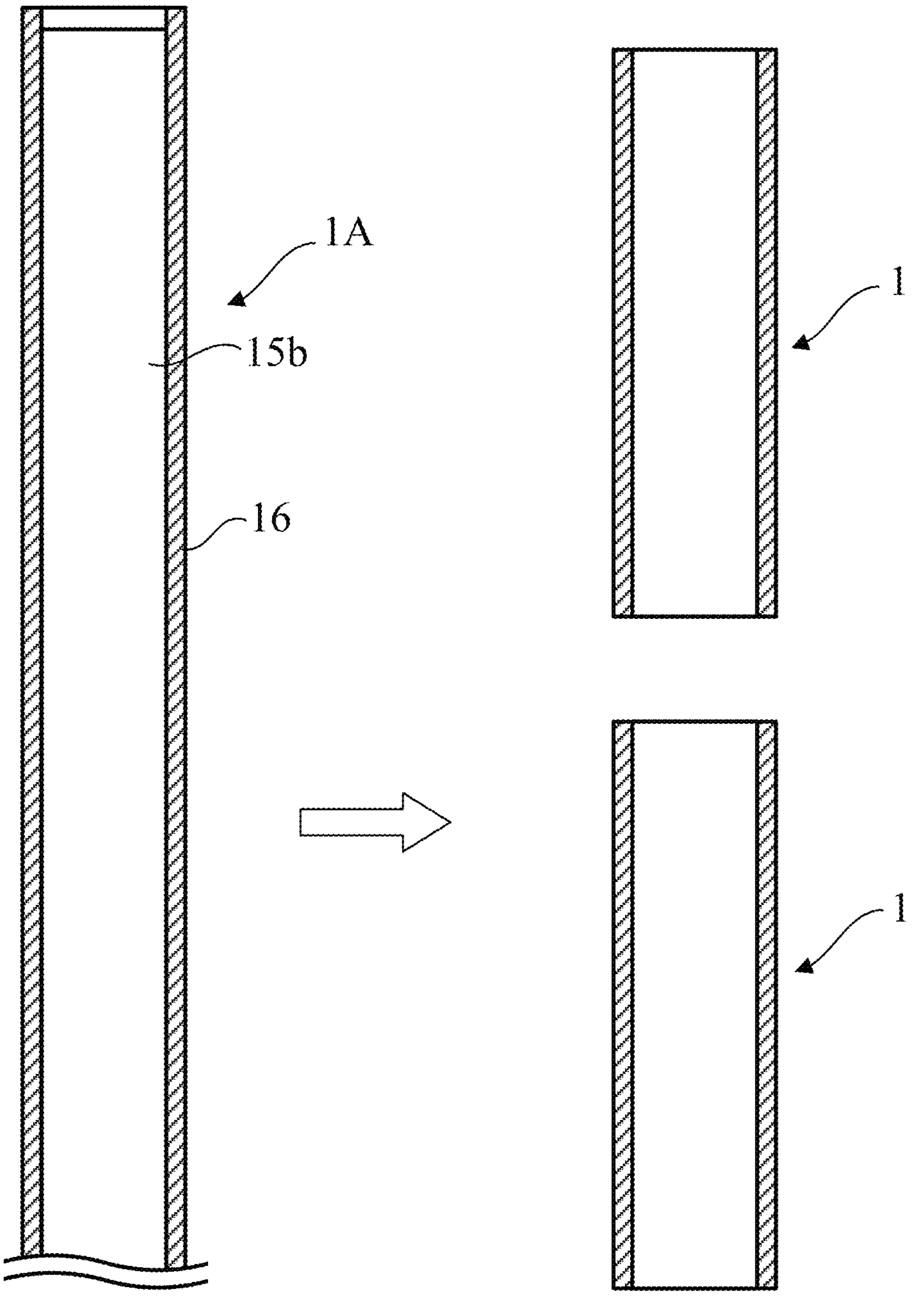
FIG. 11 is a schematic diagram showing a step after the step of FIG. 10.

Next, as shown in FIG. 10, the metal tube 11A is inserted into a ring 28 together with the tube 16A. By moving the ring 28 along the axial direction of the metal tube 11A, the tube 16A is pressed radially inward by the inner peripheral surface of the ring 28, thereby enhancing adhesion of the material of the adhesion layer 15 and the tube 16A. In FIGS. 9, 10, and 11, only the tube 16A is shown in a cross section. Thereafter, the materials 15*am* and 15*bm* of the adhesion layer 15 are heated and cured, so that the adhesion layer 15 is formed, and at the same time, the adhesion layer 15 and the tube 16A are fixed.

In this manner, the long hollow cylinder 1A shown in FIG. 11 is obtained. Then, as shown in FIG. 11, by cutting the hollow cylinder 1A in a direction perpendicular to the axial direction, fuser belts 1 are obtained as finished products.

The applicant produced samples with different materials of several layers of the fuser belt 1, measured electrical properties of the samples, and investigated whether each sample effectively reduced electrostatic offset. Details of the samples are shown in FIG. 12.

For each sample, the substrate 11, the slide layer 12, the primer layer 13, and the rubber layer 14 were common. Specifically, the substrate 11 was a seamless hollow nickel cylinder manufactured by use of electroforming, having a diameter of 40 mm and a thickness of 40 μm. The slide layer 12 was formed of PTFE and had a thickness of 12 μm.

The primer layer 13 was manufactured from "DY 39-042" manufactured by DuPont Toray Specialty Materials K.K. (Tokyo, Japan), which is a non-electroconductive silicone rubber-based adhesive. As described above, the material 13*m* of the primer layer 13 was applied on the metal tube 11A by a spray nozzle 20, and heated at 150 degrees Celsius for one minute to dry the material 13*m*, thereby forming the primer layer 13. The thickness of the primer layer 13 was 2 μm.

The rubber layer 14 was manufactured from "X-34-2008-2" manufactured by Shin-Etsu Chemical Co., Ltd. (Tokyo, Japan), which is a non-electroconductive silicone rubber. As described above, the material 14*m* of the rubber layer 14 was leveled by the blade 25 and cured by heating at 150 degrees Celsius. The thickness of the rubber layer 14 was 285 μm.

In the fuser belt 1, the layers other than the substrate 11 are basically formed using dielectrics, unless it is specified that a conductor is used. The electrostatic capacity between the substrate 11 and the surface of the surface layer 16 in the fuser belt 1 can be considered as an index representing ease of charging the fuser belt 1. The electrostatic capacity becomes smaller as the thickness of the dielectrics between the substrate 11 and the surface of the surface layer 16 becomes greater. The applicant considered that the smaller the electrostatic capacity, the lesser the charging on the surface of the surface layer 16, which is close to the toner particles T, and the lesser the electrostatic offset.

For samples 1 to 3, the first adhesion layer 15*a* was manufactured from "PJ-CL990" manufactured by The Chemours Company (Delaware, USA), which is a non-conductive fluororesin-based adhesive of which the electrical resistance is low. The thickness of the first adhesion layer 15*a* was 2 μm. Although the material 15*ma* of the first adhesion layer 15*a* is in a dispersion state, it is considered that the cured first adhesion layer 15*a* contains fluorine of high purity. The applicant thought that the presence of fluorine, which has a high electronegativity (strong force to attract electrons), between the substrate 11 and the surface of the surface layer 16 in the fuser belt 1 reduces charging on the surface of the surface layer 16, which is adjacent to the toner particles T, thereby reducing electrostatic offset. The electronegativity of fluorine is 3.98 and the largest among all atoms, whereas the electronegativity of silicon, which is the main component of silicone rubber, is 1.90. For comparison, sample 4 was not provided with the first adhesion layer 15*a*.

The applicant also thought that the electrical resistance of the fuser belt 1 in the thickness direction thereof is related to the electrostatic offset. The applicant considered that electrostatic offset can be reduced if the surface layer 16 rapidly changes from a high polarization state to a low polarization state (dielectric relaxation state) after removal of the electric field applied to the fuser belt 1. In other words, it is desirable that the dielectric relaxation time τ be small. According to TAKEUCHI, Manabu, "influence of Atmospheric Conditions on Turbocharging of Toners", Journal of the Imaging Society of Japan, Vol. 39, No. 3, 2000, pp. 270-277, the dielectric relaxation time τ can be calculated by the following equation.

$$\tau = CR \quad \text{(Equation 1)}$$

where C is the electrostatic capacity in the thickness direction of the fuser belt 1, and R is the electrical resistance in the thickness direction of the fuser belt 1.

The electrostatic capacity C can be calculated by the following equation.

$$C = \varepsilon S/d \quad \text{(Equation 2)}$$

where ε is the imaginary part of the complex permittivity of the fuser belt 1, S is the area, and d is the thickness.

From Equation 1, it is desirable that the electrostatic capacity C and/or the electrical resistance R be small. FIG. 13 shows electrical properties of the material of each layer. Methods for measuring the electrical properties will be described later. The applicant thought that by using a non-conductive fluororesin-based adhesive ("PJ-CL990") with low electrical resistance for the first adhesion layer 15*a*, the dielectric relaxation time τ can be shortened and decrease in the potential of the surface layer 16 can be promoted, so that electrostatic offset can be reduced. Accordingly, the applicant expected that electrostatic offset could be reduced in samples 1 to 3, in which the adhesive layer 15 contains a fluororesin.

On the other hand, the second adhesion layer 15*b* located outside the first adhesion layer 15*a* was manufactured from "KE-1880" manufactured by Shin-Etsu Chemical Co., Ltd., which is a non-electroconductive silicone rubber-based adhesive. However, in samples 1 and 2, an ionic conductor was added to "KE-1880", and in samples 3 and 4, an ionic conductor was not added to "KE-1880". The thickness of the second adhesion layer 15*b* was 15 μm.

As the ionic conductor, the applicant used "T-2680" manufactured by Tokyo Chemical Industry Co., Ltd. (Tokyo, Japan), which is a phosphonium-based ionic conductor represented by the following chemical formula.

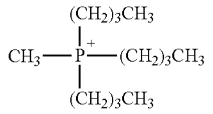

$(CF_3SO_2)_2N^-$

Since the second adhesion layer 15*b* close to the surface layer 16 of the fuser belt 1 contains an ionic conductor, electric charges move easily in the adhesion layer 15, and electric charges on the surface of the surface layer 16 of the fuser belt 1 easily leave through the adhesion layer 15. The applicant considered that electrostatic offset could be reduced if electric charges on the surface of the surface layer 16 proximate to the toner particles T could easily move. Therefore, the applicant thought that samples 1 and 2 could reduce the electrostatic offset more than samples 3 and 4. 0.5 phr (per hundred rubber) of the ionic conductor was added in sample 1, and 1.5 phr of the ionic conductor was added in sample 2.

For each sample, the surface layer 16 was produced from a tube made of PFA with a thickness of 30 μm. Specifically, an insulative PFA tube manufactured by Gunze Limited (Osaka, Japan) from "PFA 451HP-J" manufactured by Chemours-Mitsui Fluoroproducts Co., Ltd. (Tokyo, Japan) was used as the surface layer 16.

As described above, samples 1 to 4 have different adhesion layer 15 having different configurations.

Figure 14:
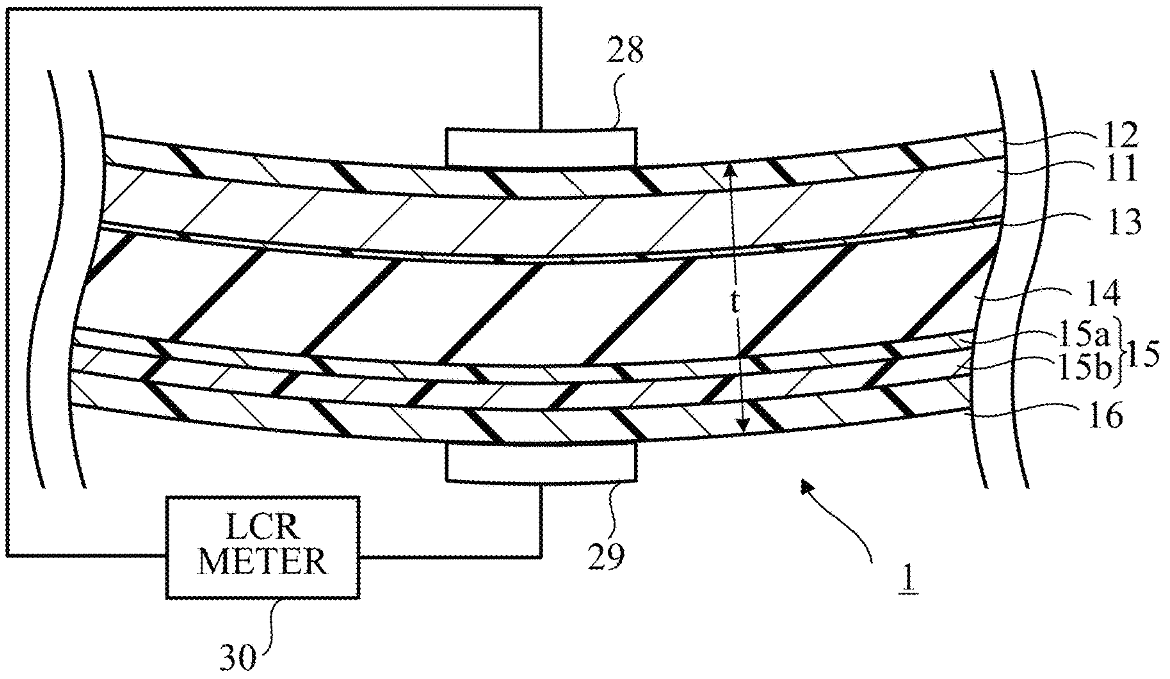
FIG. 14 is a schematic diagram showing a method of measuring the electrostatic capacity in the thickness direction of the fuser device according to an embodiment.

For each sample, the electrical resistance R (Ω) and the electrostatic capacity C (pF) in the thickness direction of the fuser belt 1 were measured in the manner depicted in FIG. 14. As described above, the electrostatic capacity is an index representing ease of charging the fuser belt 1. The manner depicted is two-terminal sensing, in which two electrodes 28 and 29 are brought into contact with the inner peripheral surface of the fuser belt 1 (the surface of the slide layer 12) and the outer peripheral surface of the fuser belt 1 (the surface of the surface layer 16), respectively, to measure the electrical resistance and the electrostatic capacity with an LCR meter 30. The LCR meter 30 used was "3522-50" manufactured by Hikoi E.E. Corporation (Nagano, Japan). The frequency used for the measurement was 1 kHz.

The electrical resistance R (Ω) and the electrostatic capacity C (pF) are shown in FIG. 12. In FIG. 12, E and subsequent numbers indicate the powers of ten. For example, "3.24E+08" indicates $3.24\times10^8$.

Furthermore, for general considerations, the measured electrostatic capacity was divided by the area A of the electrodes 28 and 29 (contact area to the fuser belt 1, i.e., 4.524 $cm^2$) to calculate the electrostatic capacity per unit area C/A in the thickness direction of the fuser belt 1. FIG. 12 show the electrostatic capacity per unit area C/A (pF/$cm^2$) in the thickness direction of the fuser belt 1.

Figure 15:
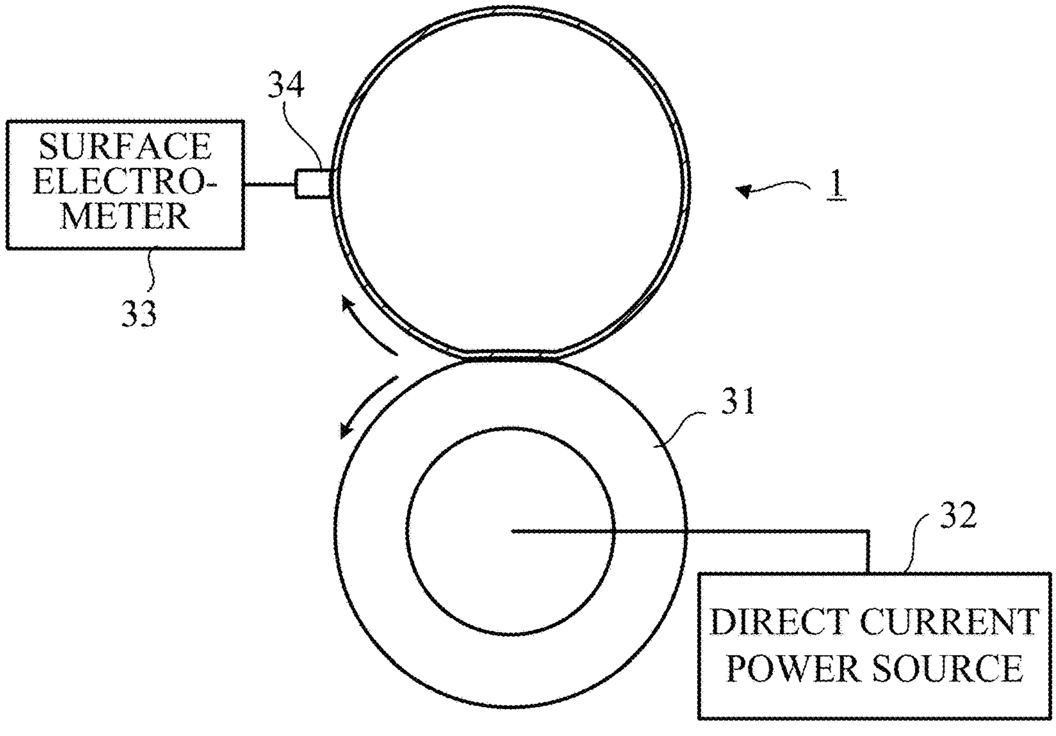
FIG. 15 is a schematic diagram showing a method of measuring the charge decay on the surface layer of the fuser device according to the embodiment.

Furthermore, for each sample, the amount of charge decay ΔV (volts) in the surface layer 16 was measured in the manner depicted in FIG. 15. In this measurement, under an environment in which the temperature was 23 degrees Celsius and the relative wetness was 55%, a charging roll 31 was brought into contact with the fuser belt 1, the fuser belt 1 was revolved at 60 rpm, and charges were supplied from the DC (direct current) power supply 32 to the fuser belt 1 via the charging roll 31. The resistance of the charging roll 31 was $5\times10^6$Ω. The DC power supply 32 was "610C" manufactured by Trek, Inc. (New York, USA).

The electrical resistances R of the layer materials shown in FIG. 13 were obtained by separately manufacturing films from the materials and by measuring the electrical resistance of each film in the same manner as described above. The thickness of each film used for the measurement is shown in FIG. 13. The imaginary part £ of the complex permittivity of each layer material shown in FIG. 13 was calculated according to Equation 2 after measuring the electrostatic capacity C of the film in the same method as described above (in this case, S is the area of the electrodes 28 and 29, and d is the thickness of the film).

The probe 34 of a surface electrometer 33 was brought into proximity with the outer peripheral surface of the fuser belt 1 (surface of the surface layer 16) to measure the surface potential. The proximity position of the probe 34 to the fuser belt 1 was 90 degrees away from the position at which the charging roll 31 was in contact with the fuser belt 1. The surface electrometer 33 was "Model 244A" of Monroe Electronics, Inc. (New York, USA), and the probe was a standard probe "1017A" attached to "Model 244A."

Under the above conditions, the surface potential of the surface layer 16 was monitored by the surface electrometer 33, and the surface of the surface layer was maintained to be charged to −1 kV for 60 seconds. Thereafter, the charging roll 31 was separated from the fuser belt 1, thereby finishing the charging. 120 seconds after end of charging, charge decay ΔV(V) of the surface of the surface layer 16 was measured. Charge decay ΔV is an index representing the difficulty of charging of the fuser belt 1. The measured charge decay ΔV is shown in FIG. 12. Furthermore, for general considerations, a value (charge decay per thickness) ΔV/t was calculated by dividing the charge decay ΔV by the thickness t of the fuser belt 1 (see FIGS. 3 and 14). The value ΔV/t (V/μm) is also shown in FIG. 12.

Furthermore, for general considerations, a ratio Ct/AΔV of the electrostatic capacity per unit area C/A in the thickness direction of the fuser belt 1 to the value ΔV/t was calculated. The ratio Ct/AΔV (F/V μm) is also shown in FIG. 12.

In addition, the dielectric relaxation time T, which is the product of the electrostatic capacity C in the thickness direction of the fuser belt 1 and the electric resistance R in the thickness direction of the fuser belt 1, was calculated in accordance with Equation 1. The calculated dielectric relaxation time τ (msec) is also shown in FIG. 12. The unit, msec, for dielectric relaxation time can be replaced with another unit, mF·Ω.

Each sample was mounted on an image forming apparatus, and the effect for reducing electrostatic offset of each sample was evaluated. The image forming apparatus used was "TASKalfa 5550ci" manufactured by Kyocera Document Solutions Inc. (Osaka, Japan). In this evaluation, a white solid image was printed on sheets of paper, and the L* value (lightness) was measured at seven spots in the image with the use of a color difference meter (chroma meter, "CR-400" manufactured by Konica Minolta, Inc. (Tokyo, Japan)) in order to determine whether fog (printing on an area that should not be printed) occurred. It was evaluated that in a case in which the L* value was 95.5 or more, it was evaluated that fog did not occur, and the electrostatic offset reducing effect was good. It was evaluated that in a case in which the L* value was less than 95.5, fog occurred and the electrostatic offset reducing effect was poor. The evaluation was conducted after printing one sheet, after printing 50 sheets, and after printing 100 sheets.

The evaluation results are shown in FIG. 12. Samples 1 and 2, in which the first adhesive layer 15*a* contains fluorine and the second adhesive layer 15*b* contains the silicone rubber and the ion conductor, showed a good electrostatic offset reducing effect. On the other hand, sample 3, which contains no ion conductor in the second adhesive layer 15*b*, showed poor electrostatic offset reducing effect. In addition, the electrostatic offset reducing effect was poor for sample 4, which did not contain a fluororesin-based adhesive in the first adhesive layer 15*a*.

It is considered that, in general, the smaller the dielectric relaxation time $\tau$ is, the more the decrease in the potential of the surface layer 16 is promoted and the more the electrostatic offset is reduced. From the results of samples 1 and 2, it is preferable that the dielectric relaxation time $\tau$ be less than 10 msec. However, for sample 3, for which the dielectric relaxation time $\tau$ was the shortest, the electrostatic offset reducing effect was poor.

In addition, in general, charge decay $\Delta V$ is an index representing the difficulty of charging of the fuser belt 1, and it is considered that if the charge decay $\Delta V$ is large, the fuser belt 1 is less likely to be charged and electrostatic offset can be reduced. However, the evaluation results in FIG. 12 do not necessarily indicate that a large charge decay $\Delta V$ causes a good effect.

The applicant accordingly focuses on the ratio $Ct/A\Delta V$ of the electrostatic capacity per unit area C/A to the amount of charge decay per thickness $\Delta V/t$, and considers that the electrostatic offset reducing effect is not only related to the dielectric relaxation time $\tau$ and the charge decay $\Delta V$, but depends also on the ratio $Ct/A\Delta V$. From the results in FIG. 12, it is preferable that the ratio $Ct/A\Delta V$ of the electrostatic capacity per unit area C/A in the thickness direction of the fuser device 1 to the value $\Delta V/t$ obtained by dividing the charge decay $\Delta V$ by the thickness t of the fuser device 1 be equal to or greater than $1.04\times10^{-18}$ F/Vμm.

Accordingly, for fuser belts 1 for which the charge decay $\Delta V$ at a moment 120 seconds after end of charging the surface of the surface layer to −1 kV is 1 V or more and 30 V or less, and for which the dielectric relaxation time $\tau$ is equal to or less than 10 msec, it is preferable that the ratio $Ct/A\Delta V$ be equal to or greater than $1.04\times10^{-18}$ F/Vμm.

The present invention has been shown and described with references to preferred embodiments thereof. However, it will be understood by those skilled in the art that various changes in form and details may be made therein without departing from the scope of the invention as defined by the claims. Such variations, alterations, and modifications are intended to be encompassed in the scope of the present invention.

For example, the slide layer 12 is not absolutely necessary.

The invention claimed is:

1. A tubular fuser device that rotates and is in contact with a sheet on which a positively charged toner image is formed to fix the toner image to the sheet, the fuser device comprising:

a tubular substrate made of a metal;

a rubber layer covering an outer periphery of the substrate;

an adhesion layer covering an outer periphery of the rubber layer; and a surface layer made of a resin covering an outer periphery of the adhesion layer, the adhesion layer having a first adhesion layer that is in contact with the rubber layer and a second adhesion layer interposed between the first adhesion layer and the surface layer, wherein the first adhesion layer is made of a fluororesin-based adhesive, and the second adhesion layer is made of a silicone rubber-based adhesive containing an ionic conductor.

2. The fuser device according to claim 1, wherein a charge decay $\Delta V$ at a moment 120 seconds after end of charging a surface of the surface layer to −1 kV is equal to or less than 30 V, wherein a dielectric relaxation time T of the fuser device is equal to or less than 10 msec, and wherein a ratio $Ct/A\Delta V$ of an electrostatic capacity per unit area C/A in a thickness direction of the fuser device to a value $\Delta V/t$ obtained by dividing the charge decay $\Delta V$ by a thickness t of the fuser device is equal to or greater than $1.04\times10^{-18}$ F/Vμm.

* * * * *